INVENTORS
THOMAS B. PRICKETT
JOHN R. BATES
BY Ira L. Nickerson
ATTORNEY

Feb. 11, 1947.    T. B. PRICKETT ET AL    2,415,441
PREPARATION OF CONTACT MATERIALS
Filed Jan. 2, 1941    3 Sheets-Sheet 2

INVENTORS
THOMAS B. PRICKETT
JOHN R. BATES
BY Ira L. Nickerson
ATTORNEY

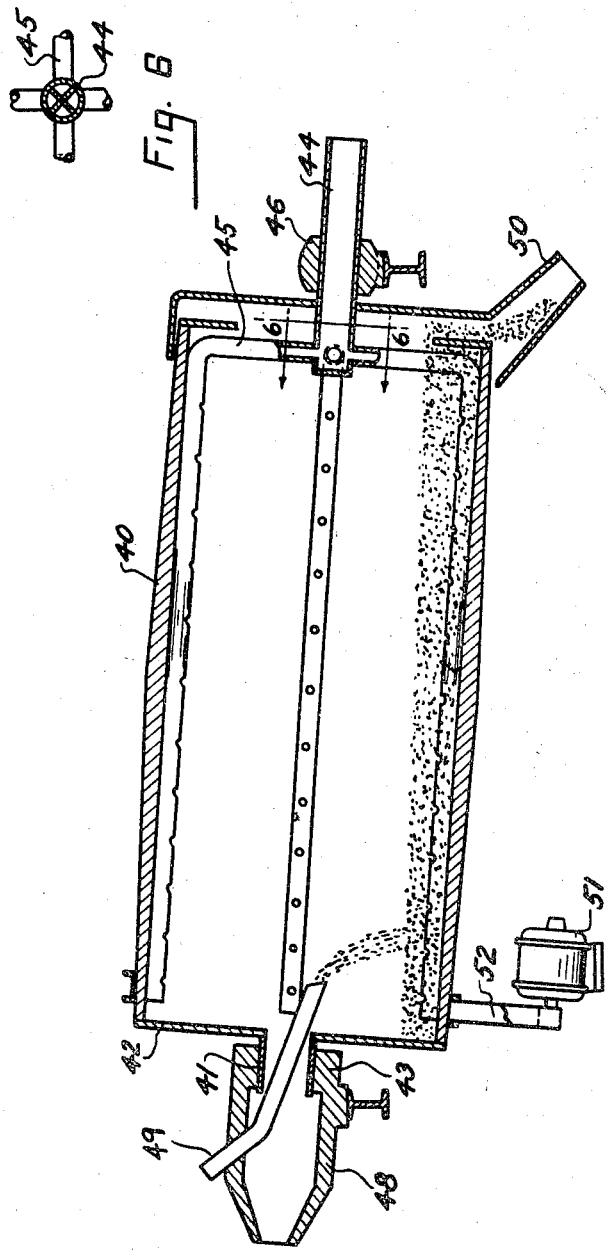

UNITED STATES PATENT OFFICE

2,415,441

PREPARATION OF CONTACT MATERIALS

Thomas B. Prickett, Merion, and John R. Bates, Swarthmore, Pa., assignors to Houdry Process Corporation, Wilmington, Del., a corporation of Delaware Application January 2, 1941, Serial No. 372,864

3 Claims. (Cl. 252—259.2)

The present invention relates to the art of surface grinding or shaping of the pieces of a bulk material with special reference to the preparation of contact materials such as catalysts and vaporizing masses.

There are employed at present two types of milling in which rotating drums are used. One type involves the use of balls, rods or other weights in the drum for acting on the material being milled. In the other type, which is known generally under the name of tumbling, the material is placed in the drum in the absence of balls or other weights and the drum then rotated. The present invention involves the application of the latter to the art of contact mass or catalyst manufacture. In the latter type of process known as tumbling the rate of grinding was so low that for many applications it would be economically impracticable. A low rate of grinding would result in a long grinding time for a batch mill or in a low feed rate for a continuous mill of any given size, e. g., large mill size for a given output. Thus this invention also involves improvements in the art of tumbling generally.

Accordingly, objects of the present invention are to provide processes and apparatus for the grinding of material constituted of pieces, particularly pieces of friable aggregate, which processes effect the grinding at a rapid rate, to provide processes of the character indicated which allow substantial increase of the feed rate to a mill of any particular size without reduction of the extent of grinding effected, and to provide improved processes and apparatus for the preparation of contact masses.

It has now been found that the rate of grinding of such materials can be expedited considerably by flowing a stream of air or the like through the mass while it is being tumbled and by venting the air so blown from the tumbling zone. Further, it has been found that when a contact material constituted of formed pieces is ground by tumbling, the capacity of the reaction case in which the contact material is employed will be substantially increased.

The process hereof is applicable to the treatment of materials or masses which are constituted of friable aggregate pieces. Friable aggregates are in general produced by forming materials such as clays, precipitates, dried gels of the non-elastic type, and the like into bodies. The pieces may be formed either wet or dry in various ways. Thus the pieces may be produced by crushing and classifying bodies of the material. Alternatively, the pieces may be formed by molding the material in moist state and drying, which molding may be effected either by extrusion or casting of the moist material, or by molding it in dry state by application of pressure.

In the application of the present invention to the manufacture of contact masses such as catalysts, material which may be clay or a dried precipitated gel such as a silica alumina gel, is formed as by molding. For this purpose it is convenient to moisten the material and to mill it to develop the plastic properties in order to assist in the molding operation. The pieces so formed are then dried. After forming and prior to use, the material should be raised to an elevated temperature as about 300° F. or above, in order to increase the strength of the pieces. This heat treatment is conducted preferably prior to the tumbling operation. Fines produced in the tumbling may, in many instances, advantageously be returned to the forming operation.

In order to effect the tumbling, the rate of rotation should be below that critical rate at which the centrifugal force acting on the material is sufficient more than to offset the force of gravity with respect to all material in the tumbling zone, since otherwise all of the material would rotate as a unit with and be carried in a fixed location on the inner wall of the tumbling drum. While very low rates of rotation may be employed at which the body of material is merely rolled within the zone, it is preferable that the rate be sufficient that the body of material be opened up by the pieces being elevated and dropped. These two critical rates between which it is preferred to operate are not constants, but vary with the diameter of the tumbling drum, and may be computed for any specific diameter by the customary physics formulae for weight ($W=mg$) and for centrifugal force $$\left(F=\frac{4\pi^2 Mr}{T^2}\right)$$

Thus, for a drum of two feet diameter, the rate of rotation should be below about 60 R. P. M. and it is preferred that the rate be between 30 and 60 R. P. M.

For the best efficiency in the blowing operation the air should be used as a blast directed at the material in the zone. It is unnecessary for the blast of air to be sufficient to move any of the pieces in the zone, and preferably it is directed at the material reposing in the lower portion of the drum. While reference is made in this description and in the subjoined claims to the use of air for blowing the material, it should be understood that, within the scope of this term as herein employed, it is intended to include any gas either above or below its critical temperature not incompatible with or detrimental to the material being treated. The conditions should be such, however, that the gas remains in vapor phase and does not drop below its dew point. The air directed at the material is vented from the zone in order to prevent building up of pressure.

The tumbled material is sifted in order to remove fines. This may advantageously be done at the same time it is tumbled by employing a perforated drum with the openings sufficiently small as to prevent passage of the pieces of material but of a size to drop out any large pieces chipped off. Alternatively the material may be sifted after tumbling.

It has been found that the rate of surface grinding of the pieces may be increased by the blowing. In some instances increases of as much as four fold have been obtained. The reason for this increase is obscure since fines would normally be expected to segregate or sift out during tumbling. A possible explanation is that powder is produced, during operations in accordance with this invention, of which a thin film adheres firmly to the surfaces of the pieces, and that this adherent film is removed by the blast of air. This film may possibly be acting as a lubricant or cushioning material preventing effective grinding. Although this theory is advanced as a possible explanation of the reason for the savings effected by the present process, it should be understood that it is not intended to limit this invention only to processes which can be proven to function in this manner.

The apparatus to which this invention relates and which is specially adapted to the performance of the above described process is shown in the accompanying drawings in which Fig. 1 is a longitudinal section of a tumbling drum of the screen type involving one embodiment hereof;

Fig. 5 is a vertical longitudinal section through a modified form of grinder; and Fig. 6 is a section on the line 6—6 in Fig. 5.

Figure 1:
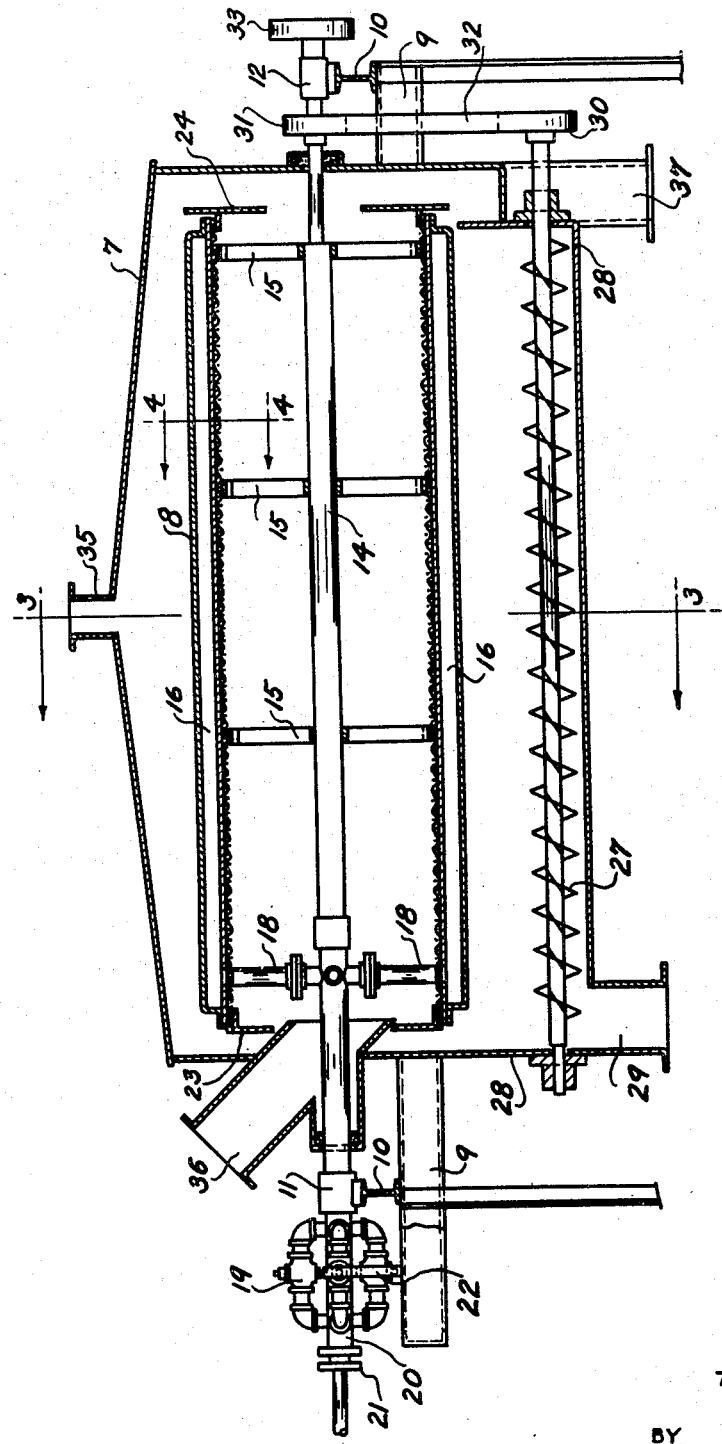
Figure 2:
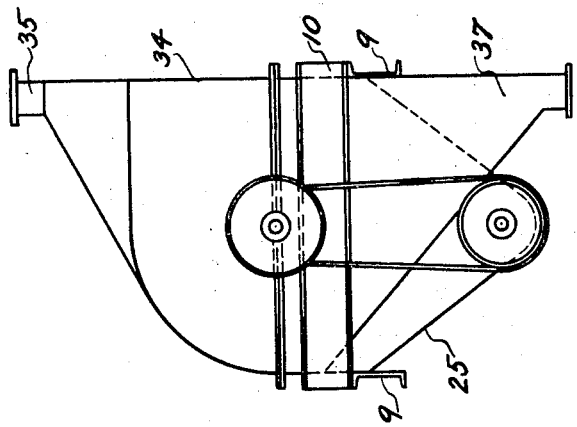
Fig. 2 is a right end elevation of the device shown in Fig. 1.

A framework of beams is provided for supporting both the housing 7 and the drum 8 and comprises longitudinal beams 9 and transverse beams 10. A pair of bearings 11, 12 is carried by the transverse beams 10. The drum 8 comprises a central supporting shaft 14 carried by the bearings 11 and 12, a cylindrically shaped screen coaxial with the shaft, and a plurality of radial supports 15 connecting the shaft and screen. Air ducts 16 are secured to the drum longitudinally thereof in spaced positions thereabout. The side of each duct adjacent the drum is provided with a row of openings 17 across which the screen of the drum extends to prevent entry of material from the drum into the ducts.

Figure 3:
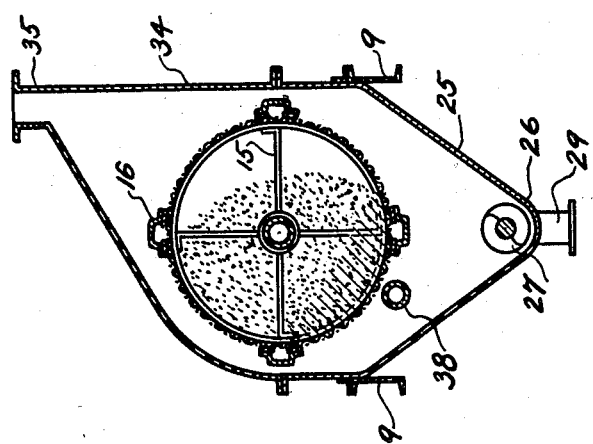
Fig. 3 is a section on the line 3—3 in Fig. 1.
Figure 4:
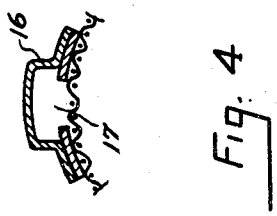
Fig. 4 is a detail section on the line 4—4 of Fig. 1 showing more particularly the construction of one of the ducts and of the jet opening therefrom.

In order to introduce air selectively into the ducts 16, one end of the shaft 14 is provided with a plurality of ducts therein severally communicating with hollow radial supports 18, each of which in turn communicates with one of the ducts 16. As seen in Fig. 1, the right hand end of each of the valves 19 communicates with one of the ducts in shaft 14 while the left hand ends of the valves 19 communicate with a common air delivery pipe 20 which has a rotatable joint 21 therein. A cam 22 mounted on one of the beams 9 is arranged to engage and press the stems of the valves as they pass the cam. By this means the valves are unseated so as to deliver air to ducts 16 during their travel through the lower left quarter of rotation as seen in Fig. 3. Thus, with the drum rotating clockwise as seen therein, the air will blow through the bed of material in the drum. In order to maintain a bed of material in the drum through which the air blows, an annular plate 23, 24 is secured to each end of the drum.

The housing 7 comprises a lower portion 25 supported by the beams 9. This lower portion 25 converges downwardly to a rounded trough 26 in which a screw conveyor 27 is positioned. The conveyor 27 is mounted for rotation in the end walls 28 and delivers fines to outlet chute 29. The shaft of conveyor 27 extends through one of the end walls and carries a pulley or sprocket 30. A second pulley or sprocket 31 is mounted on the shaft 14 coplanar therewith. A suitable belt or chain 32 operatively interconnects the two pulleys or sprockets. A main driving pulley 33 or the like is secured to the shaft 14 through which both the drum and the conveyor are driven.

The upper or cover portion 34 of the housing is shaped to enclose the upper portion of the drum and is provided with an outlet duct 35. One end of the cover 34 is provided with a charging chute 36 through which the shaft 14 extends and is arranged to convey material to be ground into the drum. The end wall of the lower portion of the housing opposite the chute 36 is formed to provide a delivery chute 37 into which finished material is discharged.

A pipe or duct 38 is positioned below and to the side of the drum which moves upwardly. A plurality of openings is provided in the pipe 38 directed toward the drum. This pipe 38 is connected with a source of air under pressure. Air issuing from this pipe may be employed to supplement the air from the ducts 16 in blowing the material tumbled, or may be substituted therefor.

To place the grinder in operation the drum 8 and screw 27 are rotated clockwise as seen in Fig. 3 by communicating power to the pulley 33 from a source not shown. Air under pressure is delivered to the pipes 20 and 38. As the drum rotates, the cam 22 holds that one of the valves 19 open which communicates with the duct 16 passing through the lower left quadrant in Fig. 3, whereby air at high velocity is blown through material in the drum. Material such as molded pieces of catalyst is fed into the drum through the chute 36. Fines sift out of the drum and are moved to the chute 29 by conveyor screw 27. Air is withdrawn from the vent 35, the volume withdrawn being either equal to or greater than that introduced through ducts 16 and pipe 38. The material gradually works its way through the drum, drops through the opening in plate 24, and drops out the chute 37. The material so treated, due to being more regularly shaped, gains in weight per unit volume, the gain being on the order of 3 to 8%, depending upon the shape of the original pieces. When the material treated is a catalyst, that much more material may then be placed in a catalyst case of any given size, thereby proportionately increasing the charging rate to maintain conditions the same as prevail when untreated catalyst is employed.

The alternative form of construction, shown in Figs. 5 and 6, and embodying this invention, involves a solid wall drum 40 supported for rotation by trunnion 41 secured to one end wall 42 which trunnion is carried by a bearing 43, and by a trunnion 44 secured to the other end of the drum by radial air ducts 45, which trunnion 44 is supported by a bearing 46. The trunnion 44 is provided with a plurality of ducts therethrough into which air may be selectively directed by a cam and valve system as shown in Fig. 1. Each of the ducts in trunnion 44 communicates with one of air ducts 45. A plurality of ducts 47, each communicating with one of the ducts 45, is secured to the inner surface of the drum, lengthwise thereof. These ducts 47 are provided with openings directed toward the center of the drum for blasting the material with air while in the lower portion of the drum during grinding. A suction pipe 48 communicates with the drum through trunnion 41, and a charging chute 49 extends through the wall of pipe 48 and through the trunnion into the drum. An outlet chute 50 is provided which covers the open lower end of the drum in order to collect discharged material. A motor 51 may be employed to rotate the drum through a belt or chain drive 52.

The operation of this form of grinder is in general the same as that shown in Figs. 1 to 4. The large particles of fines knocked off the formed pieces are in general not removed from the product by this type of device. Accordingly, it is often desirable to sift the material discharged to effect such separation.

While there are above described two specific devices particularly adapted to the described process, it should be understood that various other devices may be employed. Thus, it should be noted that either the screen or solid wall type of drum may be employed without chutes to treat batches of material, and in place of the air ducts shown a fixed duct may be located in the lower portion of the drum and supported through the trunnions and supplied with air through one of them.

What we claim is:

1. In the method of preparing as contact masses, porous friable aggregate pieces produced by agglomerating discrete particles into pieces of generally uniform size and by heating the pieces so formed to a temperature above about 300° F. and below the temperature of fusion, the process which comprises tumbling the pieces by rotation in a zone at a rate below that at which the centrifugal force is sufficient that the material rotates as a unit and at a rate sufficient that some of the pieces are elevated above the body of the material in the lower portion of the zone and dropped, blowing air through the material in the lower portion of the zone during tumbling and venting air so blown from the zone of tumbling, continuously removing fines formed in the tumbling operation, and discontinuing said tumbling after protruding edges are removed and before material reduction is effected in the weight of the pieces.

2. In the method of preparing a catalyst from formed pieces of material selected from the group consisting of clay and dried silica alumina gel, which pieces have been heated to a temperature between 300° F. and the temperature of fusion, the process comprising tumbling the formed pieces in a rotating zone, rotating at a rate below that at which the centrifugal force is sufficient that the material rotates as a unit and at a rate sufficient that some of the pieces are elevated above the body of the material in the lower portion of the zone and dropped, whereby material is ground away from the surfaces of the pieces, blowing air through the material in the lower portion of the zone during tumbling and venting air so blown from the zone of tumbling, continuously removing fines formed in the tumbling operation, and terminating tumbling of the pieces prior to the pieces being substantially reduced completely to fines.

3. In the method of preparing a catalyst from material of the group consisting of clay and dry silica-alumina gel, the steps of molding the material to form discrete aggregates, heat treating the aggregates at a temperature between 300° F. and the temperature of fusion to increase the strength of the aggregates, tumbling a mass of the heat treated aggregates by rotation in a zone at a rate below that at which the centrifugal force is sufficient to rotate the mass of aggregates as a unit, blowing air through the mass in the lower portion of the zone during tumbling at a rate sufficient to remove fines formed in the tumbling, venting the air so blown from the zone of tumbling, continuously removing fines formed in the tumbling operation, and discontinuing tumbling after protruding edges are removed from the aggregates and before said aggregates are substantially reduced entirely to fines.

THOMAS B. PRICKETT.
JOHN R. BATES.

REFERENCES CITED

The following references are of record in the file of this patent:

UNITED STATES PATENTS

| Number | Name | Date |
| --- | --- | --- |
| 1,807,197 | Clement | May 26, 1931 |
| 2,146,718 | Bond | Feb. 14, 1939 |
| 2,127,127 | Martin | Aug. 16, 1938 |
| 1,910,280 | Chamberlain | May 23, 1933 |
| 1,961,296 | Ishimura | June 5, 1934 |
| 1,205,578 | Stracke et al. | Nov. 21, 1916 |
| 2,078,945 | Houdry | May 4, 1937 |
| 2,100,354 | Pier et al. | Nov. 30, 1937 |
| 2,163,602 | Jenness | June 27, 1939 |
| 1,933,091 | Bertsch | Oct. 31, 1933 |

FOREIGN PATENTS

| Number | Country | Date |
| --- | --- | --- |
| 445,012 | British Patent | Apr. 1, 1936 |